United States Patent
Atanassova et al.

(10) Patent No.: US 9,368,787 B2
(45) Date of Patent: *Jun. 14, 2016

(54) LEAD-ACID BATTERIES AND PASTES THEREFOR

(71) Applicant: Cabot Corporation, Boston, MA (US)

(72) Inventors: Paolina Atanassova, Waltham, MA (US); Berislav Blizanac, Acton, MA (US); Miodrag Oljaca, Concord, MA (US); Toivo T. Kodas, Carlisle, MA (US); Geoffrey D. Moeser, Groton, MA (US); Pavel A. Kossyrev, Providence, RI (US); Ned J. Hardman, Woodside, CA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,964

(22) Filed: Jan. 8, 2015

(65) Prior Publication Data

US 2015/0123042 A1 May 7, 2015

Related U.S. Application Data

(63) Continuation of application No. 13/503,659, filed as application No. PCT/US2010/054393 on Oct. 28, 2010, now Pat. No. 8,932,482.

(60) Provisional application No. 61/377,925, filed on Aug. 28, 2010, provisional application No. 61/257,226, filed on Nov. 2, 2009.

(51) Int. Cl.
*H01M 4/88* (2006.01)
*H01M 4/14* (2006.01)
(Continued)

(52) U.S. Cl.
CPC ............ *H01M 4/14* (2013.01); *B82Y 30/00* (2013.01); *C01G 21/02* (2013.01); *C09C 1/48* (2013.01);
(Continued)

(58) Field of Classification Search
CPC .................. H01M 2/28; B82Y 30/00
USPC ............................ 252/182.1; 429/7
See application file for complete search history.

(56) References Cited

U.S. PATENT DOCUMENTS

| 1,987,644 A | 1/1935 | Spear et al. |
| 3,642,466 A | 2/1972 | McCaulay et al. |

(Continued)

FOREIGN PATENT DOCUMENTS

| CN | 1853306 A | 10/2006 |
| JP | 2002063905 A | 2/2002 |

(Continued)

OTHER PUBLICATIONS

Beck, et al., "Electrochemical Supercapacitors Based on Industrial Carbon Blacks in Aqueous $H_2SO_4$", Journal of Applied Electrochemistry, vol. 31, pp. 845-853, 2001 [retrieved on Dec. 10, 2010]. Retrieved from the interne: http://www.sprinerlink.com/content/h6788j453jwp560633.

(Continued)

*Primary Examiner* — Khanh Tuan Nguyen

(57) ABSTRACT

A paste suitable for a negative plate of a lead-acid battery, the paste comprising lead oxide and carbon black, wherein the carbon black has the following properties: (a) a BET surface area between about 100 and about 2100 $m^2/g$; and (b) an oil adsorption number (OAN) in the range of about 35 to about 360 cc/100 g, provided that the oil absorption number is less than the 0.14×the BET surface area+65.

10 Claims, 1 Drawing Sheet

(51) Int. Cl.

| | |
|---|---|
| *B82Y 30/00* | (2011.01) |
| *C01G 21/02* | (2006.01) |
| *C09C 1/48* | (2006.01) |
| *H01M 4/20* | (2006.01) |
| *H01M 4/62* | (2006.01) |
| *H01M 4/56* | (2006.01) |
| *H01M 4/02* | (2006.01) |

(52) U.S. Cl.
CPC ........ *H01M 4/20* (2013.01); *H01M 4/56* (2013.01); *H01M 4/627* (2013.01); *H01M 4/628* (2013.01); *C01P 2004/61* (2013.01); *C01P 2004/62* (2013.01); *C01P 2004/64* (2013.01); *C01P 2006/12* (2013.01); *C01P 2006/19* (2013.01); *C01P 2006/40* (2013.01); *C01P 2006/80* (2013.01); *H01M 2004/027* (2013.01); *Y02E 60/126* (2013.01); *Y10T 428/2982* (2015.01)

(56) References Cited

U.S. PATENT DOCUMENTS

| | | | |
|---|---|---|---|
| 5,115,378 | A | 5/1992 | Tsuchiya et al. |
| 5,260,855 | A | 11/1993 | Kaschmitter et al. |
| 5,554,739 | A | 9/1996 | Belmont |
| 5,571,311 | A | 11/1996 | Belmont et al. |
| 5,581,438 | A | 12/1996 | Halliop |
| 5,585,999 | A | 12/1996 | De Long et al. |
| 5,630,868 | A | 5/1997 | Belmont et al. |
| 5,646,815 | A | 7/1997 | Owens et al. |
| 5,672,198 | A | 9/1997 | Belmont |
| 5,689,016 | A | 11/1997 | Weider et al. |
| 5,707,432 | A | 1/1998 | Adams et al. |
| 5,713,988 | A | 2/1998 | Belmont et al. |
| 5,803,959 | A | 9/1998 | Johnson et al. |
| 5,811,204 | A | 9/1998 | Nitzan |
| 5,837,045 | A | 11/1998 | Johnson et al. |
| 5,851,280 | A | 12/1998 | Belmont et al. |
| 5,972,826 | A | 10/1999 | Boes et al. |
| 6,042,643 | A | 3/2000 | Belmont et al. |
| 6,197,870 | B1 | 3/2001 | Sakakibara |
| 6,466,429 | B1 | 10/2002 | Volfkovich et al. |
| 6,522,522 | B2 | 2/2003 | Yu et al. |
| 6,628,504 | B2 | 9/2003 | Volfkovich et al. |
| 6,706,079 | B1 | 3/2004 | Shmatko et al. |
| 6,804,108 | B2 | 10/2004 | Nanjundiah et al. |
| 7,006,346 | B2 | 2/2006 | Volfkovich et al. |
| 7,110,242 | B2 | 9/2006 | Adrianov et al. |
| 7,236,349 | B2 | 6/2007 | Miyaki et al. |
| 7,582,902 | B2 | 9/2009 | Tano et al. |
| 8,895,142 | B2 | 11/2014 | Kyrlidis et al. |
| 8,932,482 | B2 * | 1/2015 | Atanassova ............ B82Y 30/00 252/182.1 |
| 2002/0012224 | A1 | 1/2002 | Wei et al. |
| 2003/0180613 | A1 | 9/2003 | Ma |
| 2004/0002002 | A1 | 1/2004 | Mizuta et al. |
| 2004/0085709 | A1 | 5/2004 | Nanjundiah et al. |
| 2005/0063893 | A1 | 3/2005 | Ayala et al. |
| 2005/0233183 | A1 | 10/2005 | Hampden-Smith et al. |
| 2006/0234057 | A1 | 10/2006 | Kakiuchi et al. |
| 2007/0104981 | A1 * | 5/2007 | Lam ............... H01M 2/28 429/7 |
| 2007/0148335 | A1 | 6/2007 | Tanaka et al. |
| 2007/0197715 | A1 | 8/2007 | Yanagioka |
| 2008/0032181 | A1 | 2/2008 | Yamamoto |
| 2009/0208751 | A1 | 8/2009 | Green et al. |
| 2009/0325068 | A1 | 12/2009 | Boden et al. |
| 2010/0015531 | A1 | 1/2010 | Dickinson et al. |
| 2012/0214000 | A1 | 8/2012 | Kyrlidis et al. |

FOREIGN PATENT DOCUMENTS

| | | |
|---|---|---|
| WO | WO 96/18688 A1 | 6/1996 |
| WO | WO 97/47697 A1 | 12/1997 |
| WO | WO 97/47699 A1 | 12/1997 |
| WO | WO 2005/027255 A1 | 3/2005 |
| WO | WO 2009/105172 A2 | 8/2009 |

OTHER PUBLICATIONS

Everett, et al., "A Study of the Effects of Heat Treatment on the Physical Properties of the Carbon Black Vulcan 3", J. Chem. Soc., Faraday Trans. 10, vol. 82, pp. 2915-2928 (1986).

Jänes, et al., "Characterisation of Activated Nanoporous Carbon for Supercapacitor Electrode Materials", Carbon 45, pp. 1226-1233 (2007).

Richner, et al., "Studies of Activated Carbon and Carbon Black for Supercapacitor Applications", date < 2000, retrieved from the internet: http://ecl.web.psi.ch/publications/cap_pub/roy.pdf, p. 1.

Wampler, "Improved Test for Determination of Carbon Black Structure", presentation at Carbon Black World 2004, Nov. 15-18, 2004, [retrieved on Dec. 10, 2020]. Retrieved from the internet: http://www.sidrich.com/pdf/papers/paper20041.pdf, p. 5, paragraphs 1-2.

Kötz, et al., "Principles and Applications of Electrochemical Capacitors", Electrochimica Acta, vol. 45 (2000), pp. 2483-2498.

Pavlov, et al., "Influence of Expander Components on the Processes at the Negative Plates of Lead-Acid Cells on High-Rate Partial-State-of-Charge Cycling. Part II. Effect of Carbon Additives on the Processes of Charge and Discharge of Negative Plates", Journal of Power Sources, vol. 195 (2010), pp. 4444-4457.

Pavlov, et al., "Mechanism of Action of Electro chemically Active Carbons on the Processes that take Place at the Negative Plates of Lead-Acid Batteries", Journal of Power Sources, 191, 209, pp. 58-75.

International Search Report of the International Searching Authority of International Patent Application No. PCT/US2012/071269, mailed Jun. 27, 2013.

* cited by examiner

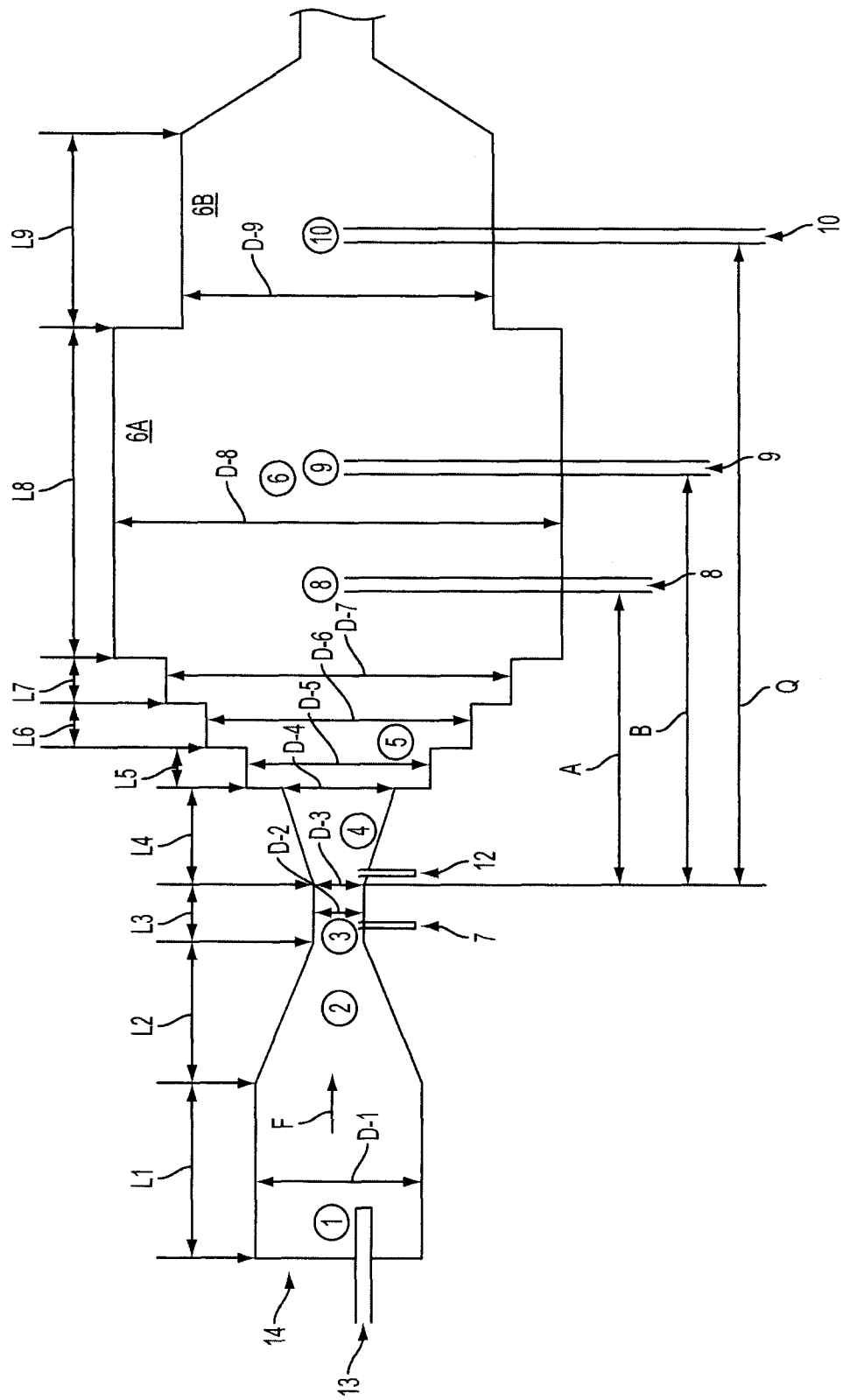

LEAD-ACID BATTERIES AND PASTES THEREFOR

This application is a continuation of and claims priority to U.S. patent application Ser. No. 13/503,659, filed on Apr. 24, 2012, which is a §371 national phase application of and claims priority to PCT/US2010/054393, filed on Oct. 28, 2010, which claims priority to U.S. Provisional Patent Applications Nos. 61/377,925, filed on Aug. 28, 2010 and 61/257,226, filed on Nov. 2, 2009. These applications are incorporated in their entirety by reference herein.

FIELD

The present invention relates to the lead-acid batteries and pastes for use in forming lead-acid battery plates, particularly negative lead-acid battery plates.

BACKGROUND

The lead-acid battery is an electrochemical storage battery generally comprising a positive plate, a negative plate, and an electrolyte comprising aqueous sulfuric acid. The plates are held in a parallel orientation and electrically isolated by porous separators to allow free movement of charged ions. The positive battery plates contain a current collector (i.e., a metal plate or grid) covered with a layer of positive, electrically conductive lead dioxide ($PbO_2$) on the surface. The negative battery plates contain a current collector covered with a negative, active material, which is typically lead (Pb) metal.

During discharge cycles, lead metal (Pb) supplied by the negative plate reacts with the ionized sulfuric acid electrolyte to form lead sulfate ($PbSO_4$) on the surface of the negative plate, while the $PbO_2$ located on the positive plate is converted into $PbSO_4$ on or near the positive plate. During charging cycles (via an electron supply from an external electrical current), $PbSO_4$ on the surface of the negative plate is converted back to Pb metal, and $PbSO_4$ on the surface of the positive plate is converted back to $PbO_2$. In effect, a charging cycle converts $PbSO_4$ into Pb metal and $PbO_2$; a discharge cycle releases the stored electrical potential by converting $PbO_2$ and Pb metal back into $PbSO_4$.

Lead-acid batteries are currently produced in flooded cell and valve regulated configurations. In flooded cell batteries, the electrodes/plates are immersed in electrolyte and gases created during charging are vented to the atmosphere. Valve regulated lead-acid batteries (VRLA) include a one-way valve which prevents external gases entering the battery but allows internal gases, such as oxygen generated during charging, to escape if internal pressure exceeds a certain threshold. In VRLA batteries, the electrolyte is normally immobilized either by absorption of the electrolyte into a glass mat separator or by gelling the sulfuric acid with silica particles.

One major problem with existing lead-acid batteries is their low cycleability at high rate charge/discharge conditions required for advanced applications such as hybrid electric vehicles and distributed storage. The main failure mode in these operating conditions is called "negative plate sulfation", which is a term used to describe the phenomenon of kinetically irreversible formation of lead sulfate ($PbSO_4$) crystallites. Ideally during each charge/discharge cycle all the lead sulfate on the negative plate is reversibly converted to lead and then back to lead sulfate. However, in reality this is not the case and during each cycle more and more lead sulfate is irreversibly formed in the negative plate. The formation of increased amounts of lead sulfate leads to several undesirable effects: the conductivity and porosity of the plate is decreased, the accessibility of sulfuric acid to the active phase is hindered and less Pb is available to participate in the discharge process, all this in combination leading to failure of the battery to deliver required voltage and power. This phenomenon is especially pronounced when fast charge/discharge cycles are used.

One known method for reducing the problem of "negative plate sulfation" is to add carbon, generally in the form of graphite, carbon black and/or activated carbon, to the paste used to produce the negative plate. The carbon increases the electrical conductivity of the active material in the discharged state thereby improving its charge acceptance. An example of such an approach is discussed in "Mechanism of action of electrochemically active carbons on the processes that take place at the negative plates of lead-acid batteries", Pavlov et al, *Journal of Power Sources*, 191, 2009, 58-75, in which the effect of adding different forms of carbon at varying levels between 0.2 to 2% by weight of the negative plate paste is studied. The carbon materials investigated are NORIT AZO activated carbon and the carbon blacks VULCAN XC72R, Black Pearls 2000 and PRINTEX® XE2.

In addition, U.S. Patent Application Publication No. 2009/0325068 discloses an expander for a battery paste for a battery plate for a lead-acid battery, comprising barium sulfate; approximately 0.2% to 6% of carbon and/or graphite; and an organic material, such as a lignosulfonate.

Further, U.S. Patent Application Publication No. 2010/0015531 discloses a paste suitable for a negative plate of battery, including an activated carbon having a mesopore volume of greater than about 0.1 $cm^3/g$ and a mesopore size range, as determined by DFT nitrogen adsorption isotherm, of about 20 angstroms to about 320 angstroms Although carbon addition is an effective approach to the reduction of "negative plate sulfation", mechanical concerns currently limit the amount of carbon added to the negative plate paste. Thus, adding carbon requires increasing the amount of water and/or sulfuric acid in the negative paste mix to lower the viscosity of the paste. However, this often results in a reduction in the adhesion of the paste to the underlying support grid and consequently, a reduction in plate integrity during paste processing and/or plate curing. For example, the paste may be displaced from the support grid due to adhesion to the equipment used for paste processing. In addition, during plate curing, the paste may flake off the grid due to poor grid contact. Further, during the curing and/or forming of the plate, cracks may form in the electrodes which subsequently lead to poor electrode performance and poor cycleability of the batteries incorporating the electrodes.

According to the present invention it has now been found that, by using certain low structure carbon blacks, the amount of additional water and/or sulfuric acid required in the paste for the carbon addition can be substantially reduced. In this way, the amount of carbon that can be added to the paste, without the ancillary reduction in the mechanical properties of the paste and the final electrode, can be significantly increased.

SUMMARY

In one aspect, the invention resides in a paste suitable for a negative plate of a lead-acid battery, the paste comprising lead oxide and carbon black at a loading of about 3 to about 25 wt % relative to the lead oxide, wherein the carbon black has the following properties:
(a) a BET surface area between about 80 and about 2100 $m^2/g$; and (b) an oil adsorption number (OAN) in the range of about 35 to about 250 cc/100 g.

Conveniently, the carbon black loading is from about 3 to about 10 wt % relative to the lead oxide.

In one embodiment, the carbon black has a BET surface area between about 600 and about 2100 m$^2$/g, such as between about 600 and about 1500 m$^2$/g.

In another embodiment, the carbon black has a BET surface area between about 80 and 600 m$^2$/g, such as between 250 and 600 m$^2$/g.

In one embodiment, the carbon black has an oil adsorption number (OAN) in the range of about 35 to about 200 cc/100 g, such as in the range of about 100 to about 200 cc/100 g.

In another embodiment, the carbon black has an oil absorption number (OAN) in the range of about 35 to about 150 cc/100 g, such in the range of about 35 to about 120 cc/100 g, for example in the range of about 35 to about 100 cc/100 g.

Conveniently, the carbon black is in the form of agglomerates of aggregated primary particles, wherein the primary particles have an average size of about 8 to about 20 nm, the primary particle aggregates have an average size of about 15 to about 150 nm and the agglomerates have an average size between about 0.5 and about 10 microns.

In a further aspect, the invention resides in a paste suitable for a negative plate of a lead-acid battery, the paste comprising lead oxide and carbon black, wherein the carbon black has the following properties:
(a) a BET surface area between about 600 and about 2100 m$^2$/g; and
(b) an oil adsorption number (OAN) in the range of about 80 to about 250 cc/100 g.

Conveniently, the carbon black loading is from about 0.2 to about 10 wt % relative to the lead oxide.

In yet a further aspect, the invention resides in a paste suitable for a negative plate of a lead-acid battery, the paste comprising lead oxide and carbon black, wherein the carbon black has the following properties:
(a) a BET surface area between about 100 and about 2100 m$^2$/g; and
(b) an oil adsorption number (OAN) in the range of about 35 to about 360 cc/100 g,
provided that the oil absorption number is less than the 0.14× the BET surface area+65.

Conveniently, the carbon black has a water adsorption in the range of about 1×OAN to about 1.5×OAN cc/100 g.

BRIEF DESCRIPTION OF THE DRAWINGS

FIG. 1 is a schematic view of part of carbon black reactor suitable for producing certain of the carbon blacks described herein.

DETAILED DESCRIPTION OF THE EMBODIMENTS

Described herein is a negative plate paste for a lead-acid battery wherein the paste comprises lead oxide and low structure carbon black particles having an oil adsorption number (OAN) in the range of about 35 to about 250 cc/100 g and/or a BET surface area in the range of about 80 to about 2100 m$^2$/g (e.g., about 100 to about 1800 m$^2$/g; about 150 to about 1600 m$^2$/g; about 200 to about 1500 m$^2$/g; about 300 to about 1250 m$^2$/g; about 350 to about 1100 m$^2$/g; about 400 to about 1000 m$^2$/g; about 500 to about 800 m$^2$/g). Typically, the oil absorption number of the carbon black particles is less than the 0.14×the BET surface area+65.

Generally, the carbon black particles used herein have an oil adsorption number (OAN) in the range of about 35 to about 250 cc/100 g (e.g., about 80 to about 200 cc/100 g, about 80 to about 250 cc/100 g, about 40 to about 225 cc/100 g, about 45 to 180 cc/100 g, about 50 to 170 cc/100 g, about 60 to 160 cc/100 g, about 70 to 150 cc/100 g, about 80 to 125 cc/100 g). The carbon black particles used herein can have an oil adsorption number (OAN) in the range of about 35 to about 200 cc/100 g, such as in the range of about 100 to about 200 cc/100 g.

All OAN values cited herein are determined by measuring the absorption of the carbon black particles for dibutylphthalate (DBP) by the method described in ASTM D2414-06a but using a manual (i.e. hand) mixing method rather than a machine mixing method. The method of ASTM D2414-06a is incorporated herein by reference.

All BET values cited herein refer to "BET nitrogen surface area" and are determined by ASTM D6556-04, the entirety of which is incorporated herein by reference.

Generally, the carbon black particles have a water adsorption in the range of about 1×OAN to about 1.5×OAN cc/100 g, wherein the water adsorption is determined by the following method. Between 2 and 5 g of carbon were placed in a series of 30 ml snap cap plastic bottles to fill about half of the bottle volume and the exact carbon powder weight was recorded for each bottle. An increasing amount of water was added to each bottle and the weight was recorded using an analytical balance capable of 0.0001 g resolution. Each bottle was capped and shaken vigorously until the sample was homogeneously mixed. The viscosity was measured of each sample using a Brookfield DV-II+ Pro with spindle kit 15 at 0.1 rotations per minute (rpm). As the carbon absorbed the water the viscosity increased until the point of saturation, where the viscosity would decrease again. The ratio of powder weight/water weight versus the viscosity was plotted and a Gaussian fit analysis was done using Origin Pro 8. The point on the Gaussian fit corresponding to maximum viscosity was used as a measure of water absorption in cc/100 g carbon.

In a first embodiment, the carbon black particles can have a broad BET surface area range between about 80 and about 2100 m$^2$/g, such as between about 600 and about 2100 m$^2$/g, for example between about 600 and about 1500 m$^2$/g. In this first embodiment, the carbon black particles are typically present in the battery paste at a loading of about 3 to about 25 wt %, such as about 3 to about 10 wt %, for example about 5 to about 10 wt %, such as about 6 to about 10 wt %, for example about 7 to about 10 wt %, relative to the lead oxide.

In a second embodiment, the carbon black particles have a high BET surface area in the range of between about 600 and about 2100 m$^2$/g, for example between about 600 and about 1500 m$^2$/g. In this second embodiment, the carbon black particles are typically present in the battery paste at a loading of about 0.5 to about 25 wt %, for example about 3 to about 10 wt %, such as about 5 to about 7 wt %, relative to the lead oxide.

In a third embodiment, the carbon black particles have a BET surface area in the range of between about 80 and about 600 m$^2$/g, for example between about 250 and about 600 m$^2$/g. In this third embodiment, the carbon black particles are typically present in the battery paste at a loading of about 0.5 to about 25 wt %, for example about 3 to about 10 wt %, such as about 5 to about 7 wt %, relative to the lead oxide.

The average primary particle size ($D_p$) is determined by ASTM D3849-04 (also called the ASTM particle size). The average aggregate size ($D_{agg}$) of the carbon black starting material may be extracted from TEM image analysis using the imaging technique described in ASTM D3849-04, the entirety of which is incorporated herein by reference, and then specifically based on the following equation:

$$D_{agg} = (D_{max} D_{min})^{0.5}$$

where $D_{max}$ is the arithmetic number average maximum diameter of the particles from TEM analysis, and $D_{min}$ is the arithmetic number average minimum diameter of the particles from TEM analysis.

Carbon black particles having an oil adsorption number (OAN) in the range of about 35 to about 130 cc/100 g and BET surface area in the range of between about 80 and about 600 m²/g are commercially available materials supplied, for example, under the trade names BP 700 (Cabot Corporation), BP 800 (Cabot Corporation), Printex L6 (Degussa) and Printex F85 (Degussa).

Carbon black particles having an oil adsorption number (OAN) in the range of about 80 to about 250 cc/100 g and BET surface area in the range of between about 600 and about 2100 m²/g can be produced using the reactor shown inn FIGURE and following the procedure described in U.S. Provisional Patent Application No. 61/257,226. In particular, process conditions that favor the production of such low structure, high surface area carbon black particles include one or more of the following:

1) introduction (e.g., injection) of large amounts of potassium or other Group IA elements or ions thereof of the Periodic Table (e.g., Na/Na⁺, K/K⁺, Cs/Cs⁺);
2) adjustment of the reactor geometry at a location along the length of the reactor in the flow direction of the reaction stream, such as by tapering the reactor diameter to reduce recirculation;
3) use of low sulfur or sulfur-free feedstock;
4) addition of calcium in the reactor to etch the carbon black therein; and
5) injection of water and oxygen downstream of the introduction point(s) of the carbon black yielding feedstock but upstream of the quench to increase temperature and provide a moist environment.

The carbon black particles used herein are typically in the form of agglomerates of aggregated primary particles, wherein the primary particles have an average size of about 8 to about 20 nm (e.g., about 10 to 15 nm), and/or the primary particle aggregates have an average size of about 35 to about 150 nm (e.g., about 45 to about 125 nm; about 50 to about 100 nm, about 60 to about 80 nm) and/or the agglomerates have an average size of from about 0.5 and about 10 microns (e.g., about 1 micron to about 8 microns; about 2 microns to about 6 microns). All particle size values cited herein are determined in accordance with ASTM D3849-04.

For example, the present carbon blacks can be produced in a furnace carbon black reactor, such as that depicted in FIG. 1, having a combustion zone 1, which has a zone of converging diameter 2, transition zone 3, conical entry section 4, stepped entry section 5, and reaction zone 6. The diameter of the combustion zone 1, up to the point where the zone of converging diameter 2 begins, is shown as D-1; the diameter of zone 3, as D-2; the entry and exit diameters of conical zone 4 as D-3 and D-4, respectively; the diameters of stepped entry zone 5 as D-5, D-6, D-7; and the diameters of reaction zone 6 as D-8 and D-9. The length of the combustion zone 1, up to the point where the zone of converging diameter 2 begins, is shown as L-1; the length of the zone of converging diameter is shown as L-2; the length of the transition zone is shown as L-3; the length of the conical section, zone 4, as L-4; and the lengths of the steps in the reactor entry section, zone 5, as L-5, L-6, and L-7. The lengths of the reaction zone 6 are L-8 and L-9.

To produce carbon blacks, hot combustion gases are generated in combustion zone 1, by contacting a liquid or gaseous fuel 13 with a suitable oxidant stream 14 such as air, oxygen, mixtures of air and oxygen or the like. When oxygen is added to the oxidant stream, it is added so as to enrich the oxygen content of the air to levels from about 21 to about 35%. Among the fuels suitable for use in contacting the oxidant stream in combustion zone 1 to generate the hot combustion gases are any of the readily combustible gas, vapor, or liquid streams such as natural gas, hydrogen, carbon monoxide, methane, acetylene, alcohol, or kerosene. Generally, the fuels have a high content of carbon-containing components, in particular, hydrocarbons. As an example, the volumetric ratio of air to natural gas utilized to produce the carbon blacks can be from about 5:1 to about 100:1. To facilitate the generation of hot combustion gases, the oxidant stream may be preheated.

The hot combustion gas stream flows downstream from zones 1 and 2 into zones 3, 4, 5, and 6. The direction of the flow of hot combustion gases is shown in FIG. 1 by the "F" arrow. Carbon black-yielding feedstock can be introduced at point 7 (located in zone 3). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

Without desiring to be bound by any particular theory, reductions in sulfur amounts are believed to depress the structure of the carbon black product, such as seen in lowered OAN values as compared to a similarly made carbon black at higher sulfur amounts. Feedstocks with lower sulfur content can be used. Sulfur levels can be, for example, from 0 to about 5 wt %, or from 0 to about 1 wt %, or 0 to about 0.5 wt %, or from 0 to about 0.1 wt %, based on total carbon black yielding feedstock used in the entire process. These sulfur level ranges and amounts also can apply to any individual carbon black yielding feedstock stream.

Generally, the carbon black-yielding feedstock is injected at point 7 in the form of a plurality of streams (not shown) which penetrate into the interior regions of the hot combustion gas stream to insure a high rate of mixing and shearing of the carbon black-yielding feedstock by the hot combustion gases so as to rapidly and completely decompose and convert the feedstock to carbon black.

The mixture of carbon black-yielding feedstock and hot combustion gases flows downstream through zone 3 into zones 4, 5, and 6. Water can be injected into zone 6 at point 8 in the reactor. Without being bound by any particular theory, this water can vaporize into steam, which increases the concentration of gaseous species that can oxidize carbon, resulting in an increased rate of oxidative attack of the carbon black surface. This can result in an etched or porous carbon black with higher surface area. The weight ratio of the amount of injected water to the carbon black-yielding feedstock is typically from 0 to about 1:1, or from about 0.1:1 to about 1:1, or from about 0.2:1 to about 0.5:1, or from about 0.3:1 to about 0.7:1, or from about 0.4:1 to about 0.8:1 and the like. This water (herein referred to as "intermediate water") is differentiated from the quench water, located at point 10, whose purpose is to stop the reaction. In FIG. 1, "A" is the distance from the beginning of zone 4 to intermediate water point 8, and will vary according to the position of the intermediate water injection.

Oxygen gas (herein referred to as "intermediate oxygen") can be added to zone 6 at point 9. Without being bound by any particular theory, the oxygen can react with combustible species like carbon monoxide and hydrogen in the gas to increase the temperature of the system, thereby increasing the rate of oxidative attack of the carbon black surface, resulting in etched or porous carbon black with higher surface area than carbon black untreated with oxygen gas. The molar ratio of intermediate oxygen to the amount of air that is added to Zone I can be from 0 to about 1:4, or from about 0.1:4 to about 1:4, or from about 0.2:4 to 0.9:4, or from about 0.3:4 to about 0.8:4 and the like. In FIG. 1, "B" is the distance from the beginning of zone 4 to intermediate oxygen point 9, and can vary according to the position of the intermediate oxygen injection. As an example, water and oxygen can be injected downstream of the carbon black-yielding feedstock introduction point and upstream of the quenching, effective to increase the temperature at least about 5%, or at least about 10%, or at least about 15%, or at least about 20%, and/or increase the moisture content at least about 5%, or at least about 10%, or at least about 15%, or at least about 20%, in the reactor relative to the temperature and the moisture content in the reactor without injecting the water and the oxygen and all other conditions the same.

Without desiring to be bound by any particular theory, adjustment of the reactor geometry (diameter) at a location between the exit of the transition zone 3 and the reaction zone 6 by gentle expansion of the reactor geometry to reduce recirculation is believed to depress the structure of the carbon black product, such as seen in lowered OAN values as compared to a similarly made carbon black in more sharply stepped reactor designs. One method of expanding the reaction zone gently is through the use of a conical zone. For example, in FIG. 1, transition zone 3 is followed by a conical zone 4 having initial diameter D-3 and final diameter D-4. As an example, dimensions D-3, D-4, and L4 of conical zone 4, such as shown in FIG. 1, can be related, for example, wherein (D-3/L4) can be from about 0.5 to about 0.8 (D-4/L4), or from about 0.6 to about 0.7 (D-4/L4). For example, as an illustration only, where D-3 is 0.15 m, D-4 is 0.23 m, and L4 is 0.46 m, then (D-3/L4) is 0.66 (D-4/L4).

Quench 11 of the reactor, located at point 10, injects a quenching fluid, which may be water, and is utilized to stop the further formation of carbon blacks. Point 10 may be determined in any manner known to the art for selecting the position of a quench to stop pyrolysis. In FIG. 1, "Q" is the distance from the beginning of zone 4 to quench point 10, and will vary according to the position of the quench. For these carbon blacks, as an example, Q can be maximized to maximize the available time for etching to create high surface area.

After the mixture of hot combustion gases and carbon black-yielding feedstock is quenched, the cooled gases pass downstream into any conventional cooling and separating apparatus whereby the carbon blacks are recovered. The separation of the carbon black from the gas stream is readily accomplished by a conventional apparatus such as a precipitator, cyclone separator or bag filter. This separation may be followed by pelletizing using, for example, a wet pelletizer.

Substances that contain at least one Group IA and at least one Group IIA element (or ion thereof) of the Periodic Table can be introduced into the reactor. Preferably, the substance contains at least one alkali metal and at least one alkaline earth metal. Examples of Group IA elements include lithium, sodium, potassium, rubidium, cesium, or francium, or any combination of two or more of these. Examples of Group IIA elements include calcium, barium, strontium, or radium, or any combination of two or more of these. The substances can be a solid, solution, dispersion, gas, or any combination thereof. More than one substance having the same or different Group IA or Group IIA element or ion can be used. The substances can be the metal (or metal ion) itself, a compound containing one or more of these elements, including a salt containing one or more of these elements, and the like. Exemplary Group IA metal salts include both organic and inorganic salts, for example, salts, e.g., of sodium and/or potassium, with any of chloride, acetate, or formate, or combinations of two or more such salts. Exemplary Group IIA metal salts include both organic and inorganic salts, for example, salts, e.g., of calcium, with any of chloride, acetate, or formate, or combinations of two or more such salts. The substances are capable, for example, of introducing a metal or metal ion into the reaction that is ongoing to form the carbon black product. The substances can be added together, separately, sequentially, or in different reaction locations. For instance, the substances can be added at any point prior to the complete quenching, including prior to the introduction of the carbon black yielding feedstock in zone 1 or 2; during the introduction of the carbon black yielding feedstock in zone 3; after the introduction of the carbon black yielding feedstock in zones 4-10; or any step prior to complete quenching. More than one point of introduction of the substance can be used. The amount of the metal- or metal ion-containing substance can be any amount as long as a carbon black product can be formed. In certain preferred embodiments, the substances may introduce potassium or potassium ion in combination with calcium or calcium ion.

For example, the Group IA element or ion can be added in a total amount from 0 to about 1 wt %, based on the total carbon yielding feedstock on a mass basis. The introduction of relatively large amounts of potassium or other Group IA elements or ions into the reaction is believed to depress the structure of the carbon black product, such as is seen in lowered OAN values as compared to a similarly made carbon black without potassium introduction. Without being bound by any particular theory, the charge of the Group IA metal ions may provide a repulsive force between individual carbon black particles. This repulsive force may keep particles from aggregating, thus decreasing the overall structure of the carbon black, as reflected by the OAN value. To effect a reduction in the OAN value, the Group IA elements (e.g., potassium) and/or ions thereof can be added in an amount effective for that result, for example, in amounts of from about 0.01 wt % to about 1 wt %, or from about 0.05 wt % to about 1 wt %, or from about 0.1 wt % to about 1 wt %, or from about 0.2 wt % to about 1 wt %, or from about 0.5 wt % to about 1 wt %, or from about 0.05 wt % to about 0.5 wt %, or from about 0.05 wt % to about 0.15 wt %, or from about 0.05 wt % to about 0.25 wt %, or from about 0.05 wt % to about 0.5 wt %, based on the total carbon yielding feedstock used in the entire process.

Similarly, the Group IIA element or ions can be added in a total amount from 0 to about 1 wt % of the total carbon yielding feedstock on a mass basis. The introduction of relatively large amounts of calcium or other Group IIA elements or ions is believed to effect etching of the carbon black in the reactor, resulting in a higher surface area compared to a similarly made carbon black without calcium introduction. Without being bound by any particular theory, the Group IIA metal ions may act in a catalytic manner to increase the rate of oxidative attack of the carbon black surface by the gas-phase species in the tail gas. These effects can result in an etched or porous carbon black with higher surface area. To effect an increase in surface area, the Group IIA elements (e.g., calcium) and/or ions thereof can be added in an amount effective for that result, for example, in amounts of from about 0.01 wt % to about 1 wt %, or from about 0.05 wt % to about 1 wt %, or from about 0.1 wt % to about 1 wt %, or from about 0.2 wt % to about 1 wt %, or from about 0.5 wt % to about 1 wt %, or from about 0.05 wt % to about 0.5 wt %, or from about 0.05 wt % to about 0.15 wt %, or from about 0.05 wt % to about 0.25 wt %, or from about 0.05 wt % to about 0.5 wt %, of the total carbon yielding feedstock used in the entire process.

The substances introducing the Group IA element or ion with the Group IIA element or ion can be added in any fashion including any conventional means. In other words, the substances can be added in the same manner that a carbon black yielding feedstock is introduced. The substance can be added as a gas, liquid, or solid, or any combination thereof. The substances containing potassium/potassium ions and calcium/calcium ions can be added at one point or several points, such as illustrated as point 12 in FIG. 1, and can be added as a single stream or a plurality of streams. The substance also or alternatively can be mixed in with the feedstock, fuel, and/or oxidant prior to and/or during their introduction, such as, for example, one or more of feed streams 7, 13, and 14 shown in FIG. 1, or at other reactor locations. The potassium/potassium ions and calcium/calcium ions can be introduced at different points and/or through separate injectors in the reactor (not shown).

The substances can be added in an amount such that about 200 ppm or more of the Group IA element or ion and/or Group IIA element or ion is present in the carbon black product ultimately formed. Other amounts include from about 200 ppm to about 20000 ppm or more and other ranges can be from about 500 ppm to about 20000 ppm, or from about 1000 ppm to about 20000 ppm, or from about 5000 ppm to about 20000 ppm, or from about 10000 ppm to about 20000 ppm, or from about 300 ppm to about 5000 ppm, or from about 500 ppm to about 3000 ppm, or from about 750 ppm to about 1500 ppm, of the Group IA and/or Group IIA element or ion present in the carbon black product that is formed.

The present high surface area and low structure carbon black can be prepared, for example, by simultaneously adjusting the burner natural gas rate, enrichment oxygen rate, feedstock rate, feedstock type, Group IA element concentration in the feedstock, Group IIA element concentration in the feedstock, intermediate water rate and location, and intermediate oxygen rate and location to achieve the desired properties. Selection of the particular reactor geometry described herein also can be significant in achieving the desired properties. The surface area of the carbon black can be increased, for example, by increasing the burner natural gas rate, increasing the enrichment oxygen rate, decreasing the feedstock rate, increasing the Group IIA element concentration, and/or increasing the intermediate water rate while simultaneously increasing the intermediate oxygen rate. The OAN value can be decreased, for example, by decreasing the burner natural gas rate, decreasing the enrichment oxygen rate, decreasing the feedstock rate, increasing the Group IA element concentration, and/or decreasing the intermediate water rate while simultaneously decreasing the intermediate oxygen rate. The exact levels of each variable required to create carbon black with the desired properties can depend on the geometry of the reactor and the method of injection of each species into the reactor. Some examples are described in more detail below.

In addition to lead oxide and carbon black particles, the present battery paste may include one or more of the other components of expander formulations normally employed in the negative plates of lead-acid batteries, for example barium sulfate and/or a lignosulfonate or other organic material. In addition, the paste will contain sulfuric acid in sufficient amount to produce the desired consistency in the paste. To produce a battery plate, the components of the paste are added to a commercial paste mixing machine, mixed to the desired consistency and then applied to an electrically conducting lead alloy structure known as a grid. Typically, this pasted grid is then cured in a heated chamber containing air with a high relative humidity. This curing process produces the necessary chemical and physical structure required for subsequent handling and performance in the battery. Following curing, the plate is dried using any suitable means. The resultant plate, comprising negative active material, is then suitable for use in a lead-acid battery.

The present battery paste may be used in both flooded cell and valve regulated lead-acid batteries.

The present invention includes the following aspects/embodiments/features in any order and/or in any combination:

1. The present invention relates to a paste suitable for a negative plate of a lead-acid battery, the paste comprising lead oxide and carbon black at a loading of about 3 to about 25 wt % relative to the lead oxide, wherein the carbon black has the following properties:
   (a) a BET surface area between about 80 and about 2100 $m^2/g$; and
   (b) an oil adsorption number (OAN) in the range of about 35 to about 250 cc/100 g.
2. The paste of any preceding or following embodiment/feature/aspect, wherein the carbon black loading is from about 3 to about 10 wt % relative to the lead oxide.
3. The paste of any preceding or following embodiment/feature/aspect, wherein the carbon black has a BET surface area between about 600 and about 2100 $m^2/g$.
4. The paste of any preceding or following embodiment/feature/aspect, wherein the carbon black has a BET surface area between about 600 and about 1500 $m^2/g$.
5. The paste of any preceding or following embodiment/feature/aspect, wherein the carbon black has BET surface area between about 80 and 600 $m^2/g$.
6. The paste of any preceding or following embodiment/feature/aspect, wherein the carbon black has BET surface area between about 250 and 600 $m^2/g$.
7. The paste of any preceding or following embodiment/feature/aspect, wherein the carbon black has an oil adsorption number (OAN) in the range of about 35 to about 200 cc/100 g.
8. The paste of any preceding or following embodiment/feature/aspect, wherein the carbon black has an oil adsorption number (OAN) in the range of about 80 to about 200 cc/100 g.
9. The paste of any preceding or following embodiment/feature/aspect, wherein the carbon black has an oil absorption number (OAN) in the range of about 35 to 120 cc/100 g.
10. The paste of any preceding or following embodiment/feature/aspect, wherein the carbon black has an oil absorption number (OAN) in the range of about 35 to 100 cc/100 g.
11. The paste of any preceding or following embodiment/feature/aspect, wherein the carbon black has a water adsorption in the range of about 1×OAN to about 1.5×OAN cc/100 g.
12. The paste of any preceding or following embodiment/feature/aspect, wherein the carbon black has an average primary particle size of about 8 to about 20 nm.
13. The paste of any preceding or following embodiment/feature/aspect, wherein the carbon black has an average aggregate size of about 35 to about 150 nm.

14. The paste of any preceding or following embodiment/feature/aspect, wherein the carbon black has an average agglomerate size between about 0.5 and about 10 microns.
15. The paste of any preceding or following embodiment/feature/aspect, wherein the carbon black has been modified to comprise surface organic groups.
16. A negative plate for a lead-acid battery produced from the paste of any preceding or following embodiment/feature/aspect.
17. A lead-acid battery comprising a negative plate produced from the paste of any preceding or following embodiment/feature/aspect.
18. A paste suitable for a negative plate of a lead-acid battery, the paste comprising lead oxide and carbon black, wherein the carbon black has the following properties:
   (a) a BET surface area between about 600 and about 2100 $m^2/g$; and
   (b) an oil adsorption number (OAN) in the range of about 80 to about 250 cc/100 g.
19. The paste of any preceding or following embodiment/feature/aspect, wherein the carbon black loading is about 0.5 to about 10 wt % relative to the lead oxide.
20. The paste of any preceding or following embodiment/feature/aspect, wherein the carbon black has an oil adsorption number (OAN) in the range of about 80 to about 200 cc/100 g.
21. The paste of any preceding or following embodiment/feature/aspect, wherein the carbon black has a water adsorption in the range of about 1×OAN to about 1.5×OAN cc/100 g.
22. The paste of any preceding or following embodiment/feature/aspect, wherein the carbon black has an average primary particle size of about 8 to about 20 nm.
23. The paste of any preceding or following embodiment/feature/aspect, wherein the carbon black has an average aggregate size of about 35 to about 150 nm.
24. The paste of any preceding or following embodiment/feature/aspect, wherein the carbon black has an average agglomerate size between about 0.5 and about 10 microns.
25. The paste of any preceding or following embodiment/feature/aspect, wherein the carbon black has been modified to comprise surface sulfate or sulfonate groups.
26. A negative plate for a lead-acid battery produced from the paste of any preceding or following embodiment/feature/aspect.
27. A lead-acid battery comprising a negative plate produced from the paste of any preceding or following embodiment/feature/aspect.
28. A paste suitable for a negative plate of a lead-acid battery, the paste comprising lead oxide and carbon black, wherein the carbon black has the following properties:
   (a) a BET surface area between about 100 and about 600 $m^2/g$; and
   (b) an oil adsorption number (OAN) in the range of about 35 to about 120 cc/100 g.
29. The paste of any preceding or following embodiment/feature/aspect, wherein the carbon black loading is about 0.2 to about 25 wt % relative to the lead oxide.
30. The paste of any preceding or following embodiment/feature/aspect, wherein the carbon black loading is about 0.5 to about 10 wt % relative to the lead oxide.
31. The paste of any preceding or following embodiment/feature/aspect, wherein the carbon black has an oil adsorption number (OAN) in the range of about 35 to about 100 cc/100 g.
32. The paste of any preceding or following embodiment/feature/aspect, wherein the carbon black has a water adsorption in the range of about 1×OAN to about 1.5×OAN cc/100 g.
33. The paste of any preceding or following embodiment/feature/aspect, wherein the carbon black has an average primary particle size of about 8 to about 20 nm.
34. The paste of any preceding or following embodiment/feature/aspect, wherein the carbon black has an average aggregate size of about 15 to about 150 nm.
35. The paste of any preceding or following embodiment/feature/aspect, wherein the carbon black has an average agglomerate size between about 0.5 and about 10 microns.
36. The paste of any preceding or following embodiment/feature/aspect, wherein the carbon black has been modified to comprise surface sulfate or sulfonate groups.
37. A negative plate for a lead-acid battery produced from the paste of any preceding or following embodiment/feature/aspect.
38. A lead-acid battery comprising a negative plate produced from the paste of any preceding or following embodiment/feature/aspect.
39. A paste suitable for a negative plate of a lead-acid battery, the paste comprising lead oxide and carbon black, wherein the carbon black has the following properties:
   (a) a BET surface area between about 100 and about 2100 $m^2/g$; and
   (b) an oil adsorption number (OAN) in the range of about 35 to about 360 cc/100 g,
provided that the oil absorption number is less than the 0.14× the BET surface area+65.
40. The paste of any preceding or following embodiment/feature/aspect, wherein the carbon black loading is about 0.2 to about 10 wt % relative to the lead oxide.
41. The paste of any preceding or following embodiment/feature/aspect, wherein the carbon black has a BET surface area between about 600 and about 2100 $m^2/g$.
42. The paste of any preceding or following embodiment/feature/aspect, wherein the carbon black has a BET surface area between about 600 and about 1500 $m^2/g$.
43. The paste of any preceding or following embodiment/feature/aspect, wherein the carbon black has BET surface area between about 80 and 600 $m^2/g$.
44. The paste of any preceding or following embodiment/feature/aspect, wherein the carbon black has BET surface area between about 250 and 600 $m^2/g$.
45. The paste of any preceding or following embodiment/feature/aspect, wherein the carbon black has an oil adsorption number (OAN) in the range of about 35 to about 200 cc/100 g.
46. The paste of any preceding or following embodiment/feature/aspect, wherein the carbon black has an oil adsorption number (OAN) in the range of about 80 to about 200 cc/100 g.
47. The paste of any preceding or following embodiment/feature/aspect, wherein the carbon black has an oil absorption number (OAN) in the range of about 35 to 120 cc/100 g.
48. The paste of any preceding or following embodiment/feature/aspect, wherein the carbon black has an oil absorption number (OAN) in the range of about 35 to 100 cc/100 g.
49. The paste of any preceding or following embodiment/feature/aspect, wherein the carbon black has an average primary particle size of about 8 to about 20 nm.

50. The paste of any preceding or following embodiment/feature/aspect, wherein the carbon black has an average aggregate size of about 35 to about 150 nm.
51. The paste of any preceding or following embodiment/feature/aspect, wherein the carbon black has an average agglomerate size between about 0.5 and about 10 microns.
52. The paste of any preceding or following embodiment/feature/aspect, wherein the carbon black has been modified to comprise surface organic groups.
53. A negative plate for a lead-acid battery produced from the paste of any preceding or following embodiment/feature/aspect.
54. A lead-acid battery comprising a negative plate produced from the paste of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

The invention will now be more particularly described with reference to the following non-limiting Examples.

EXAMPLES 1 to 5

The characteristics of 5 carbon black samples of the current invention are described in the following Table.

| | | | | | | | |
|---|---|---|---|---|---|---|---|
| BET [m2/g] | | | 230 | 670 | 1050 | 1430 | 1800 |
| OAN (ml/100 g) | | | 117 | 130 | 140 | 165 | 200 |
| Electrical Resistivity (mΩ × cm at 272 kg/cm$^2$) | | | 330 | 175 | 250 | 255 | N/A |
| Particle size distribution (μm) | Pre-dispersed | D10 | 2.3 | 2.5 | 2.5 | 3.1 | N/A |
| | | D50 | 4.2 | 4.9 | 4.4 | 6.1 | N/A |
| | | D90 | 7.7 | 9.2 | 9.2 | 22.1 | N/A |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A paste suitable for a negative plate of a lead-acid battery, the paste comprising lead oxide and carbon black, wherein the carbon black has the following properties:
   (a) a BET surface area between about 600 and about 2100 m$^2$/g; and
   (b) an oil adsorption number (OAN) in the range of about 80 to about 250 cc/100 g.
2. The paste of claim 1, wherein the carbon black loading is about 0.5 to about 10 wt % relative to the lead oxide.
3. The paste of claim 1, wherein the carbon black has an oil adsorption number (OAN) in the range of about 80 to about 200 cc/100 g.
4. The paste of claim 1, wherein the carbon black has a water adsorption in the range of about 1×OAN to about 1.5× OAN cc/100 g.
5. The paste of claim 1, wherein the carbon black has an average primary particle size of about 8 to about 20 nm.
6. The paste of claim 1, wherein the carbon black has an average aggregate size of about 35 to about 150 nm.
7. The paste of claim 1, wherein the carbon black has an average agglomerate size between about 0.5 and about 10 microns.
8. The paste of claim 1, wherein the carbon black has been modified to comprise surface sulfate or sulfonate groups.
9. A negative plate for a lead-acid battery produced from the paste of claim 1.
10. A lead-acid battery comprising a negative plate produced from the paste of claim 1.

* * * * *